US010742748B2

(12) United States Patent
De Lavarene et al.

(10) Patent No.: US 10,742,748 B2
(45) Date of Patent: Aug. 11, 2020

(54) SYSTEM AND METHOD FOR SUPPORTING LIVE ADDITION OF A TENANT IN A CONNECTION POOL ENVIRONMENT

(71) Applicant: Oracle International Corporation, Redwood Shores, CA (US)

(72) Inventors: Jean De Lavarene, Versailles (FR); Saurabh Verma, Bangalore (IN); Vidya Hegde, Bangalore (IN); Chandra Sekhar Krishna Mahidhara, Bangalore (IN); Aramvalarthanathan Namachivayam, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 10 days.

(21) Appl. No.: 15/644,502

(22) Filed: Jul. 7, 2017

(65) Prior Publication Data

US 2018/0048717 A1 Feb. 15, 2018

Related U.S. Application Data

(60) Provisional application No. 62/374,481, filed on Aug. 12, 2016.

(51) Int. Cl.
*H04L 29/08* (2006.01)
*G06F 9/54* (2006.01)
(Continued)

(52) U.S. Cl.
CPC ............ *H04L 67/141* (2013.01); *G06F 9/547* (2013.01); *G06F 16/27* (2019.01);
(Continued)

(58) Field of Classification Search
CPC ....... H04L 67/141; H04L 67/14; H04L 67/42; H04L 41/12; G06F 16/27
(Continued)

(56) References Cited

U.S. PATENT DOCUMENTS 6,199,110 B1 3/2001 Rizvi
8,543,554 B1 9/2013 Singh et al.
(Continued)

OTHER PUBLICATIONS

"Database Live Migration with Oracle Multitenant and the Oracle Universal Connection Pool (UCP) on Oracle Real Application Clusters (RAC)", An Oracle White Paper, Oct. 2014, 12 pages.
(Continued)

*Primary Examiner* — Minh Chau Nguyen
(74) *Attorney, Agent, or Firm* — Tucker Ellis LLP

(57) ABSTRACT

Described herein are systems and methods for providing access to a database in a multi-tenant environment, including the use of a connection pool, and support for live addition of a tenant. When a pluggable database (PDB), for use by a tenant, is added to a multi-tenant database, it can generate an event to notify the connection pool. The connection pool environment consumes this PDB-add event, and dynamically configures a new tenant to access the shared pool. Since the new tenant addition is based on receipt of an event from the database, the connection pool does not require manual configuration for that tenant. Once a tenant is added, it can borrow connections from the pool in the same manner as existing tenants, and can also share existing pool properties, such as, for example a maximum pool size, or maximum number of connections per tenant.

20 Claims, 8 Drawing Sheets

(51) Int. Cl.
*G06F 16/27* (2019.01)
*H04L 12/24* (2006.01)
*H04L 29/06* (2006.01)

(52) U.S. Cl.
CPC .......... *H04L 41/0896* (2013.01); *H04L 67/14* (2013.01); *H04L 41/12* (2013.01); *H04L 67/42* (2013.01)

(58) Field of Classification Search
USPC ........................................................ 709/223
See application file for complete search history.

(56) References Cited

U.S. PATENT DOCUMENTS

| | | | |
|---|---|---|---|
| 9,098,565 | B1 | 8/2015 | Kumarjiguda et al. |
| 9,361,366 | B1 | 6/2016 | Yancey et al. |
| 9,690,622 | B1* | 6/2017 | Argenti ................ G06F 9/5027 |
| 10,095,800 | B1 | 10/2018 | Yalamanchi |
| 10,356,173 | B2 | 7/2019 | Chang et al. |
| 2004/0006711 | A1 | 1/2004 | Krishnaswamy et al. |
| 2004/0143562 | A1 | 7/2004 | Chen et al. |
| 2005/0120117 | A1 | 6/2005 | Burckart et al. |
| 2005/0187979 | A1 | 8/2005 | Christensen et al. |
| 2006/0146878 | A1 | 7/2006 | Srivastava |
| 2007/0136311 | A1 | 6/2007 | Kasten et al. |
| 2008/0008095 | A1 | 1/2008 | Gilfix |
| 2008/0228923 | A1 | 9/2008 | Chidambaran et al. |
| 2009/0034537 | A1 | 2/2009 | Colrain et al. |
| 2010/0036957 | A1 | 2/2010 | Patel et al. |
| 2011/0277027 | A1* | 11/2011 | Hayton ............... H04L 63/0815 726/8 |
| 2011/0307615 | A1 | 12/2011 | Krishnaswamy et al. |
| 2012/0054245 | A1 | 3/2012 | Colle et al. |
| 2012/0066363 | A1 | 3/2012 | Somogyi |
| 2012/0221608 | A1 | 8/2012 | An et al. |
| 2013/0066955 | A1 | 3/2013 | Neel |
| 2013/0097204 | A1 | 4/2013 | Venkataraman et al. |
| 2014/0324911 | A1 | 10/2014 | de Lavarene et al. |
| 2014/0372484 | A1* | 12/2014 | Baker ................... G06F 16/27 707/781 |
| 2014/0378756 | A1* | 12/2014 | Buster ................. A61B 17/435 600/34 |
| 2014/0379756 | A1 | 12/2014 | Shivarudraiah et al. |
| 2015/0026405 | A1 | 1/2015 | Hegde et al. |
| 2015/0095343 | A1 | 4/2015 | Divilly et al. |
| 2015/0127680 | A1* | 5/2015 | Dutta ................... G06F 16/245 707/771 |
| 2015/0169650 | A1 | 6/2015 | Gajic |
| 2015/0207758 | A1* | 7/2015 | Mordani ................ H04L 47/78 709/226 |
| 2017/0083386 | A1* | 3/2017 | Wing ..................... G06F 9/542 |
| 2017/0331674 | A1 | 11/2017 | Wang |
| 2017/0331829 | A1 | 11/2017 | Lander et al. |
| 2018/0019922 | A1 | 1/2018 | Robison et al. |

OTHER PUBLICATIONS

United States Patent and Trademark Office, Office Action dated Oct. 5, 2018 for U.S. Appl. No. 15/227,897, 14 Pages.

European Patent Office, International Searching Authority, International Search Report and Written Opinion dated Nov. 7, 2017 for International Application No. PCT/US2017/045283, 12 Pages.

Nicolas Michael et al., "Downtime-Free Live Migration in a Multitenant Database", 25 pages retrieved on Nov. 13, 2017 from: <http://nmichael.de/tpctc/TPCTC2014-downtime-free-database-live-migration.pdf>.

Das, et al., "Oracle Database: JDBC Developer's Guide, 12c Release 1 (12.1)", Jun. 2014, 6 pages.

United States Patent and Trademark Office, Office Action dated Jun. 13, 2019 for U.S. Appl. No. 15/227,897, 17 Pages.

United States Patent and Trademark Office, Office Action dated Jun. 27, 2019 for U.S. Appl. No. 15/644,508, 19 Pages.

United States Patent and Trademark Office, Office Action dated Aug. 22, 2019 for U.S. Appl. No. 15/644,508, 16 Pages.

United States Patent and Trademark Office, Office Action dated Nov. 26, 2019 for U.S. Appl. No. 15/644,505, 13 pages.

United States Patent and Trademark Office, Office Action dated Feb. 12, 2020 for U.S. Appl. No. 15/644,508, 16 pages.

United States Patent and Trademark Office, Office Action dated Mar. 16, 2020 for U.S. Appl. No. 15/644,504, 29 pages.

* cited by examiner

000
SYSTEM AND METHOD FOR SUPPORTING LIVE ADDITION OF A TENANT IN A CONNECTION POOL ENVIRONMENT

CLAIM OF PRIORITY

This application claims the benefit of priority to U.S. Provisional Application titled "SYSTEM AND METHOD FOR SUPPORTING LIVE ADDITION OF A TENANT IN A CONNECTION POOL ENVIRONMENT", Application No. 62/374,481, filed Aug. 12, 2016, which is herein incorporated by reference.

CROSS-REFERENCE TO RELATED APPLICATIONS

This application is related to U.S. patent application Ser. No. 15/644,504, titled "SYSTEM AND METHOD FOR CONTROL OF MAXIMUM CONNECTIONS IN A CONNECTION POOL ENVIRONMENT", filed Jul. 7, 2017; U.S. patent application Ser. No. 15/644,505, titled "SYSTEM AND METHOD FOR PERFORMING CONNECTION VALIDATION IN A MULTI-TENANT ENVIRONMENT", filed Jul. 7, 2017; U.S. application Ser. No. 15/644,508, titled "SYSTEM AND METHOD FOR USE OF SERVER-SIDE CONNECTION POOL TAGGING IN A MULTI-TENANT ENVIRONMENT", filed Jul. 7, 2017; and U.S. patent application Ser. No. 15/227,897, titled "SYSTEM AND METHOD FOR PROVIDING DYNAMIC RELOCATION OF TENANTS IN A MULTI-TENANT DATABASE ENVIRONMENT", filed Aug. 3, 2016; each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software application servers and databases, and are particularly related to systems and methods for providing access to a database in a multi-tenant environment, including the use of a connection pool, and additional functionalities.

BACKGROUND

Generally described, in a database environment, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

SUMMARY

Described herein are systems and methods for providing access to a database in a multi-tenant environment, including the use of a connection pool, and support for live addition of a tenant. When a pluggable database (PDB), for use by a tenant, is added to a multi-tenant database, it can generate an event to notify the connection pool. The connection pool environment consumes this PDB-add event, and dynamically configures a new tenant to access the shared pool. Since the new tenant addition is based on receipt of an event from the database, the connection pool does not require manual configuration for that tenant. Once a tenant is added, it can borrow connections from the pool in the same manner as existing tenants, and can also share existing pool properties, such as, for example a maximum pool size, or maximum number of connections per tenant.

DETAILED DESCRIPTION

As described above, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

Creating connection objects can be costly in terms of time and resources. For example, tasks such as network communication, authentication, transaction enlistment, and memory allocation, all contribute to the amount of time and resources it takes to create a particular connection object. Since connection pools allow the reuse of such connection objects, they help reduce the number of times that the various objects must be created.

One example of a connection pool is Oracle Universal Connection Pool (UCP), which provides a connection pool for caching Java Database Connectivity (JDBC) connections. For example, the connection pool can operate with a JDBC driver to create connections to a database, which are then maintained by the pool; and can be configured with properties that are used to further optimize pool behavior, based on the performance and availability requirements of a requesting software application.

Connection Labeling

Figure 1:
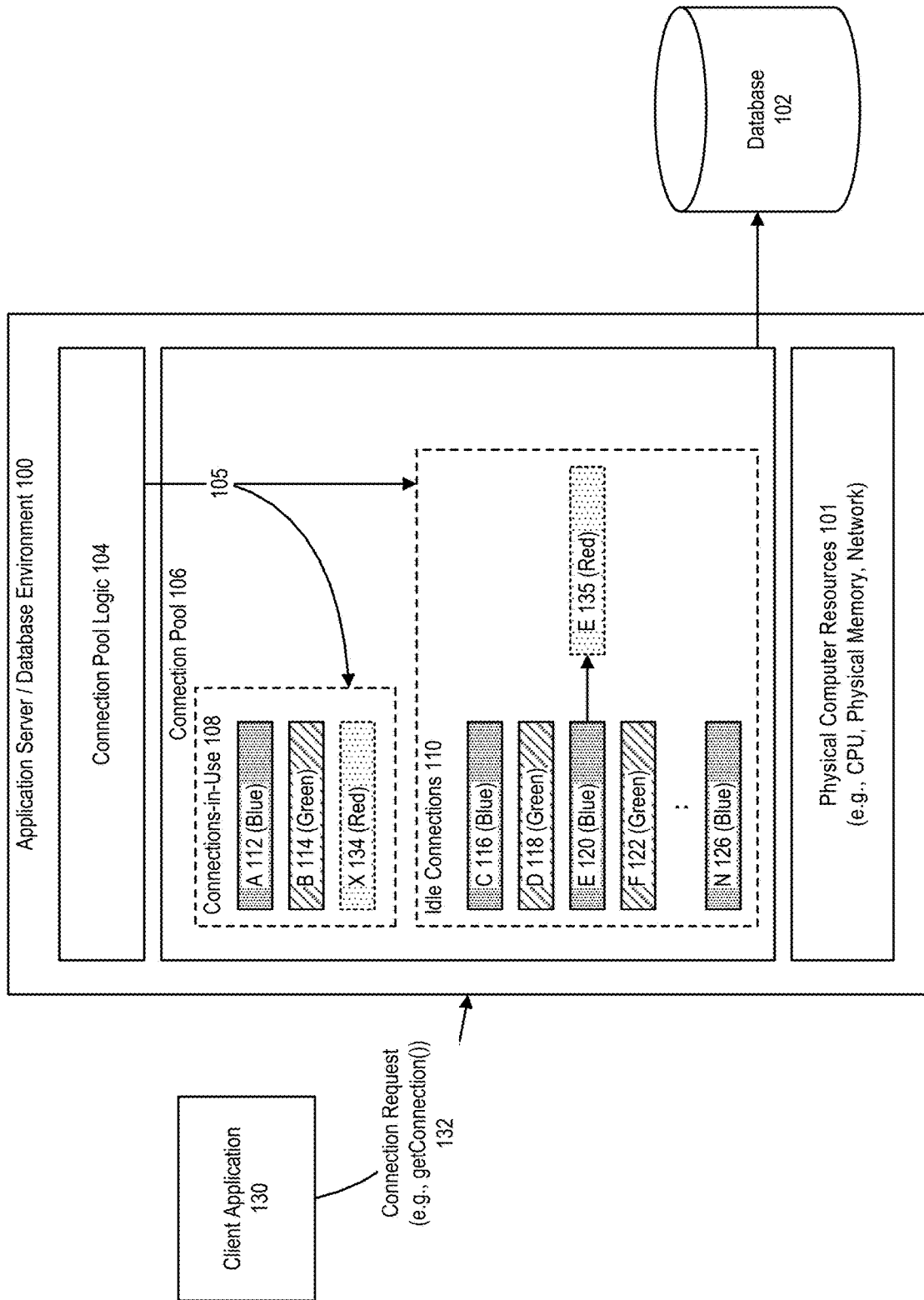
FIG. 1 illustrates a system that includes a connection pool, in accordance with an embodiment.

FIG. 1 illustrates a system that includes a connection pool, in accordance with an embodiment.

As illustrated in FIG. 1, in accordance with an embodiment, an application server or database environment 100, which includes physical computer resources 101 (e.g., a processor/CPU, memory, and network components), for example an Oracle WebLogic Server, Oracle Fusion Middleware, or other application server or database environment, can include or provide access to a database 102, for example an Oracle database, or other type of database.

As further illustrated in FIG. 1, in accordance with an embodiment, the system also includes a connection pool logic 104 or program code, which when executed by a computer controls 105 the creation and use of connection objects in a connection pool 106, including, for example, connections that are currently in use 108 by a software application, and connections that are idle 110, or are not currently being used.

Software applications can initialize connections retrieved from a connection pool, before using the connection to access, or perform work at the database. Examples of initialization can include simple state re-initializations that require method calls within the application code, or more complex initializations including database operations that require round trips over a network. The computational cost of these latter types of initialization may be significant.

Some connection pools (for example, UCP) allow their connection pools to be configured using connection pool properties, that have get and set methods, and that are available through a pool-enabled data source instance. These get and set methods provide a convenient way to programmatically configure a pool. If no pool properties are set, then a connection pool uses default property values.

In accordance with an embodiment, labeling connections allows a client software application to attach arbitrary name/value pairs to a connection. The application can then request a connection with a desired label from the connection pool. By associating particular labels with particular connection states, an application can potentially retrieve an already-initialized connection from the pool, and avoid the time and cost of re-initialization. Connection labeling does not impose any meaning on user-defined keys or values; the meaning of any user-defined keys and values is defined solely by the application.

For example, as illustrated in FIG. 1, in accordance with an embodiment, the connection pool can include a plurality of connections that are currently in use by software applications, here indicated as connections A 112 and B 114. Each of the connections can be labeled, for example connection A is labeled (Blue) and connection B is labeled (Green). These labels/colors are provided for purposes of illustration, and as described above can be arbitrary name/value pairs attached to a connection by a client application. In accordance with various embodiments, different types of labels can be used, to distinguish between different connection types; and different applications can attach different labels/colors to a particular connection type.

As further illustrated in FIG. 1, in accordance with an embodiment, the connection pool can also include a plurality of connections that are idle, or are not currently being used by software applications, here indicated as connections C 116, D 118, E 120, F 122, G 124 and N 126. Each of the idle connections can be similarly labeled, in this illustration as (Blue) or (Green), and again these labels/colors are provided for purposes of illustration.

As further illustrated in FIG. 1, in accordance with an embodiment, if a software application 130 wishes to make a request on the database, using a particular type of connection, for example a (Red) connection, then the application can make a "getConnection(Red)" request 132. In response, the connection pool logic will either create a new (Red) connection, here indicated as X 134 (Red); or repurpose an existing idle connection from (Blue or Green) to (Red), here indicated as E 135 (Red).

Sharded Databases

In accordance with an embodiment, sharding is a database-scaling technique which uses a horizontal partitioning of data across multiple independent physical databases. The part of the data which is stored in each physical database is referred to as a shard. From the perspective of a software client application, the collection of all of the physical databases appears as a single logical database.

In accordance with an embodiment, the system can include support for use of a connection pool with sharded databases. A shard director or listener provides access by software client applications to database shards. A connection pool (e.g., UCP) and database driver (e.g., a JDBC driver) can be configured to allow a client application to provide a shard key, either during connection checkout or at a later time; recognize shard keys specified by the client application; and enable connection by the client application to a particular shard or chunk. The approach enables efficient re-use of connection resources, and faster access to appropriate shards.

Figure 2:
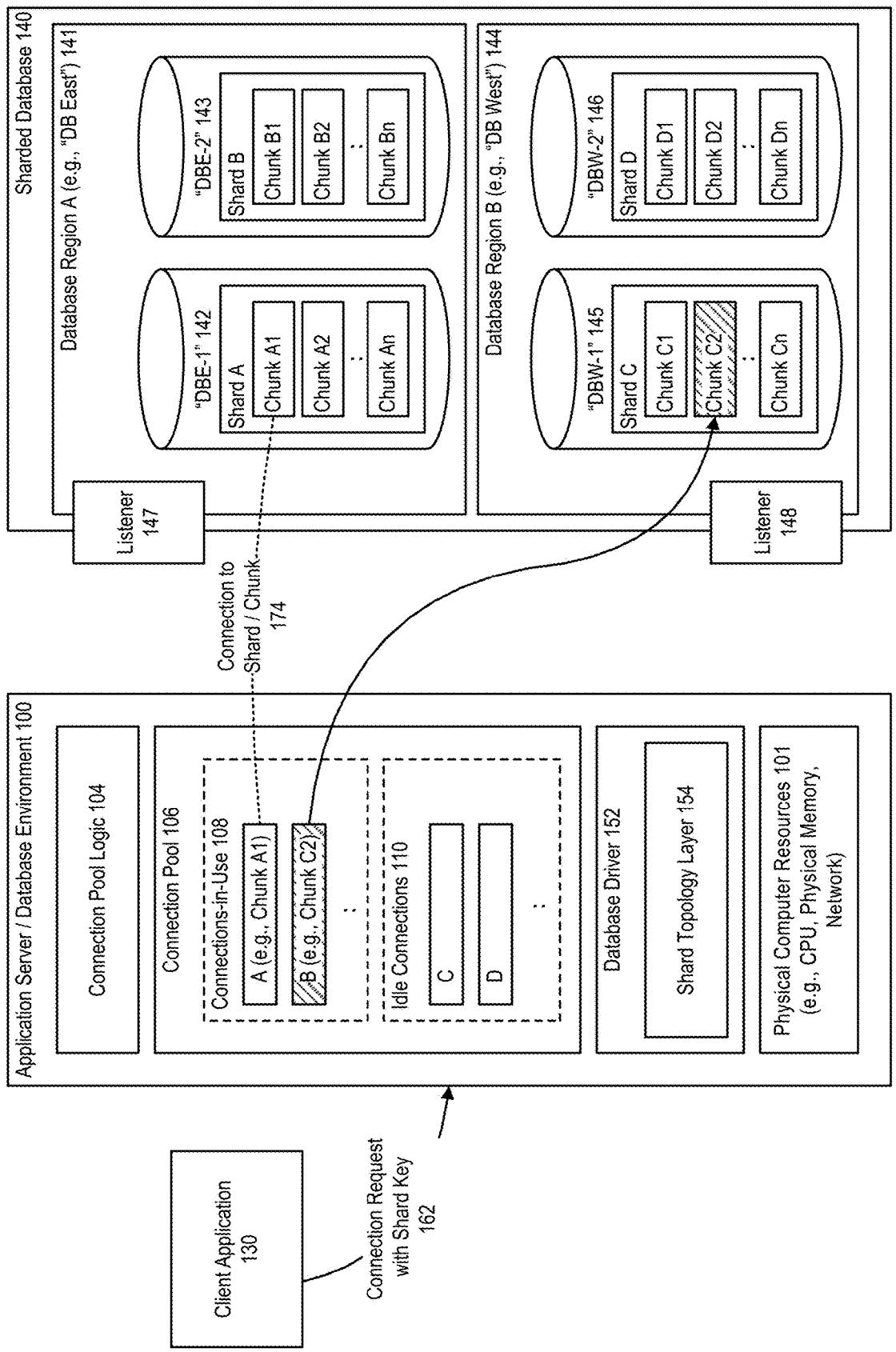
FIG. 2 further illustrates a system that includes a connection pool, including support for use of a sharded database, in accordance with an embodiment.

FIG. 2 further illustrates a system that includes a connection pool, including support for use of a sharded database, in accordance with an embodiment.

In accordance with an embodiment, a database table can be partitioned using a shard key (SHARD_KEY), for example as one or more columns that determine, within a particular shard, where each row is stored. A shard key can be provided in a connect string or description as an attribute of connect data (CONNECT_DATA). Examples of shard keys can include a VARCHAR2, CHAR, DATE, NUMBER, or TIMESTAMP in the database. In accordance with an embodiment, a sharded database can also accept connections without a shard key or shard group key.

In accordance with an embodiment, to reduce the impact of resharding on system performance and data availability, each shard can be subdivided into smaller pieces or chunks. Each chunk acts as a unit of resharding that can be moved from one shard to another. Chunks also simplify routing, by adding a level of indirection to the shard key mapping.

For example, each chunk can be automatically associated with a range of shard key values. A user-provided shard key can be mapped to a particular chunk, and that chunk mapped to a particular shard. If a database operation attempts to operate on a chunk that is not existent on a particular shard, then an error will be raised. When shard groups are used, each shard group is a collection of those chunks that have a specific value of shard group identifier.

A shard-aware client application can work with sharded database configurations, including the ability to connect to one or multiple database shards in which the data is partitioned based on one or more sharding methods. Each time a database operation is required, the client application can determine the shard to which it needs to connect.

In accordance with an embodiment, a sharding method can be used to map shard key values to individual shards. Different sharding methods can be supported, for example: hash-based sharding, in which a range of hash values is assigned to each chunk, so that upon establishing a database connection the system applies a hash function to a given value of the sharding key, and calculates a corresponding hash value which is then mapped to a chunk based on the range to which that value belongs; range-based sharding, in which a range of shard key values is assigned directly to individual shards; and list-based sharding, in which each shard is associated with a list of shard key values.

As illustrated in FIG. 2, in accordance with an embodiment a sharded database 140 can comprise a first database region A (here indicated as "DB East", DBE) 141, including sharded database instances "DBE-1" 142, with a shard A stored as chunks A1, A2, ... An; and "DBE-2" 143, with a shard B stored as chunks B1, B2, ... Bn.

As further illustrated in FIG. 2, in accordance with an embodiment, a second database region B (here indicated as "DB West", DBW) 144, includes sharded database instances "DBW-1" 145, with a shard C stored as chunks C1, C2, ... Cn; and "DBW-2" 146, with a shard D stored as chunks D1, D2, ... Dn.

In accordance with an embodiment, each database region or group of sharded database instances can be associated with a shard director or listener (e.g., an Oracle Global Service Managers (GSM) listener, or another type of listener). For example, as illustrated in FIG. 2, a shard director or listener 147 can be associated with the first database region A; and another shard director or listener 148 can be associated with the second database region B. The system can include a database driver (e.g., a JDBC driver) 152 that maintains a shard topology layer 154, which over a period of time learns and caches shard key ranges to the location of each shard in a sharded database.

In accordance with an embodiment, a client application can provide one or more shard keys to the connection pool during a connection request 162; and, based on the one or more shard keys, and information provided by the shard topology layer, the connection pool can route the connection request to a correct or appropriate shard.

In accordance with an embodiment, the connection pool can also identify a connection to a particular shard or chunk by its shard keys, and allow re-use of a connection when a request for a same shard key is received from a particular client application.

For example, as illustrated in FIG. 2, in accordance with an embodiment, a connection to a particular chunk (e.g., chunk A1) can be used to connect 174, to that chunk. If there are no available connections in the pool to the particular shard or chunk, the system can attempt to repurpose an existing available connection to another shard or chunk, and re-use that connection. The data distribution across the shards and chunks in the database can be made transparent to the client application, which also minimizes the impact of re-sharding of chunks on the client.

When a shard-aware client application provides one or more shard keys to the connection pool, in association with a connection request; then, if the connection pool or database driver already has a mapping for the shard keys, the connection request can be directly forwarded to the appropriate shard and chunk, in this example, to chunk C2.

When a shard-aware client application does not provide a shard key in association with the connection request; or if the connection pool or database driver does not have a mapping for a provided shard key; then the connection request can be forwarded to an appropriate shard director or listener.

Multi-Tenant Environments

In accordance with an embodiment, the system can include support for cloud-based or multi-tenant environments using connection labeling. For example, a multi-tenant cloud environment can include an application server or database environment that includes or provides access to a database for use by multiple tenants or tenant applications, in a cloud-based environment.

Figure 3:
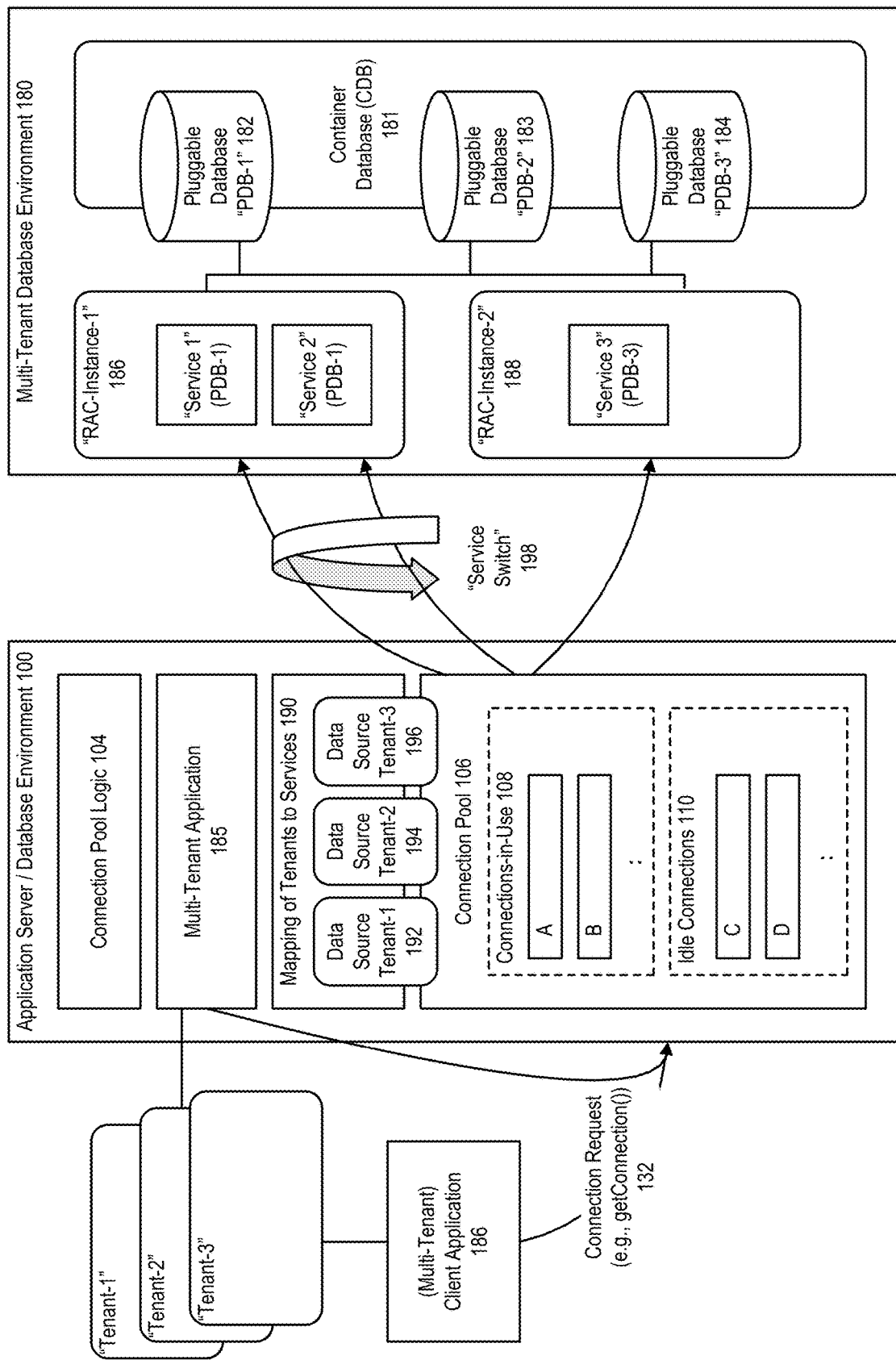
FIG. 3 further illustrates a system that includes a connection pool, including support for use in a multi-tenant environment, in accordance with an embodiment.

FIG. 3 further illustrates a system that includes a connection pool, including support for use in a multi-tenant environment, in accordance with an embodiment.

Software applications, which can be accessed by tenants via a cloud or other network, may, similarly to the environments described above, initialize connections retrieved from a connection pool before using the connection.

As described above, examples of initialization can include simple state re-initializations that require method calls within the application code, or more complex initializations including database operations that require round trips over a network.

As also described above, labeling connections allows an application to attach arbitrary name/value pairs to a connection, so that the application can then request a connection with a desired label from the connection pool, including the ability to retrieve an already-initialized connection from the pool and avoid the time and cost of re-initialization.

As illustrated in FIG. 3, in accordance with an embodiment, a multi-tenant database environment 180 can include, for example, a container database (CDB) 181, and one or more pluggable database (PDB), here illustrated as "PDB-1" 182, "PDB-2" 183, and "PDB-3" 184.

In accordance with an embodiment, each PDB can be associated with a tenant, here illustrated as "Tenant-1", "Tenant-2", and "Tenant-3", of a multi-tenant application that is either hosted by the application server or database environment 185, or provided as an external client application 186, and which provides access to the database environment through the use of one or more Oracle Real Application Cluster (RAC) instances 186, 188, including in this example "RAC-Instance-1", and "RAC-Instance-2"; one or more services, including in this example Service-1", "Service-2", and "Service-3", and a mapping of tenants to services 190.

In the example illustrated in FIG. 3, an application being used by a tenant to access the database environment, can make connection requests associated with that tenant's data source 192, 194, 196, and the system can switch services 198 if necessary, to utilize connections to existing RAC instances or PDBs.

Server-Side Connection Pools

In accordance with an embodiment, the system can utilize a server-side connection pool tagging feature, such as that provided, for example, by Oracle Database Resident Connection Pooling (DRCP). A server-side connection pool tagging feature allows user applications or clients to selectively obtain a connection to a database environment, based on use of a single tag that is understood by that database environment.

In accordance with an embodiment, only one tag is associated per connection. The database server does not communicate the tag value to the user applications or clients, but rather communicates a tag-match (for example, as a Boolean value).

Live Addition of a Tenant

In accordance with an embodiment, the system can include support for live addition of a tenant.

When a pluggable database (PDB), for use by a tenant, is added to a multi-tenant database, it can generate an event to notify the connection pool. The connection pool environment consumes this PDB-add event, and dynamically configures a new tenant to access the shared pool. Since the new tenant addition is based on receipt of an event from the database, the connection pool does not require manual configuration for that tenant. Once a tenant is added, it can borrow connections from the pool in the same manner as existing tenants, and can also share existing pool properties, such as, for example a maximum pool size, or maximum number of connections per tenant.

Figure 4:
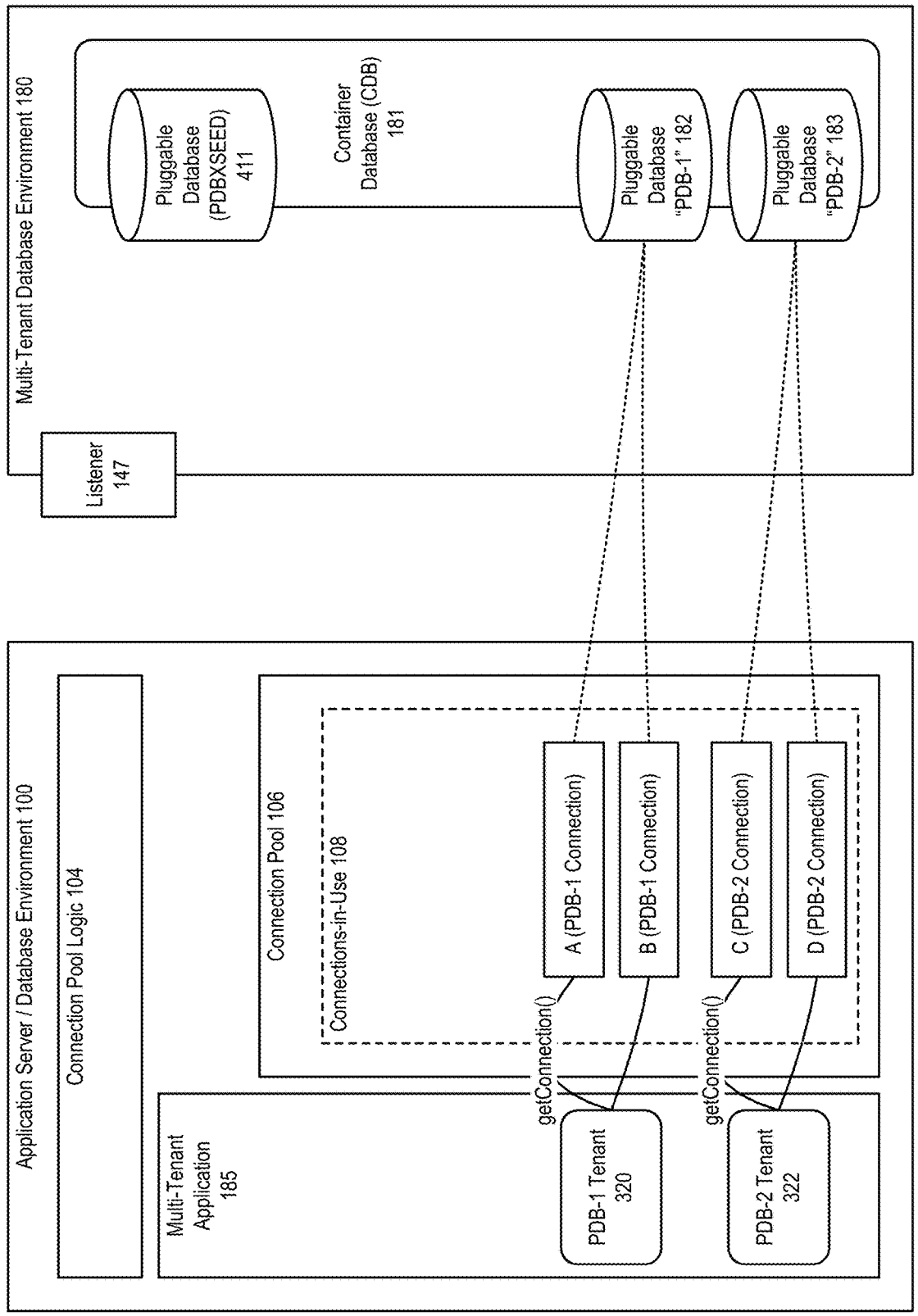
FIG. 4 illustrates an embodiment which supports live addition of a tenant, in a connection pool environment.

FIG. 4 illustrates an embodiment which supports live addition of a tenant, in a connection pool environment.

As illustrated in FIG. 4, in accordance with an embodiment, an exemplary environment can include two or more existing tenants 320, 322, each of which tenants is associated with a pluggable database in the container database 181.

For example, tenant 320 can be associated with pluggable database "PDB-1" 182, and tenant 322 can be associated with pluggable database "PDB-2" 183.

In accordance with an embodiment, each tenant can be associated with a multi-tenant or other client application hosted either by the application server or database environment, or provided as an external client application, and can use the connection pool 106 to access the pluggable database associated with that tenant.

As shown in FIG. 4, the container database can include a seed template pluggable database (seed PDB) 411, which is a system-supplied template used by the container database to create new PDBs. The default configuration of each new PDB can be altered by a system administrator. For example, a new PDB default can open up in READ ONLY mode, and the READ ONLY mode can be altered to READ WRITE mode.

Figure 5:
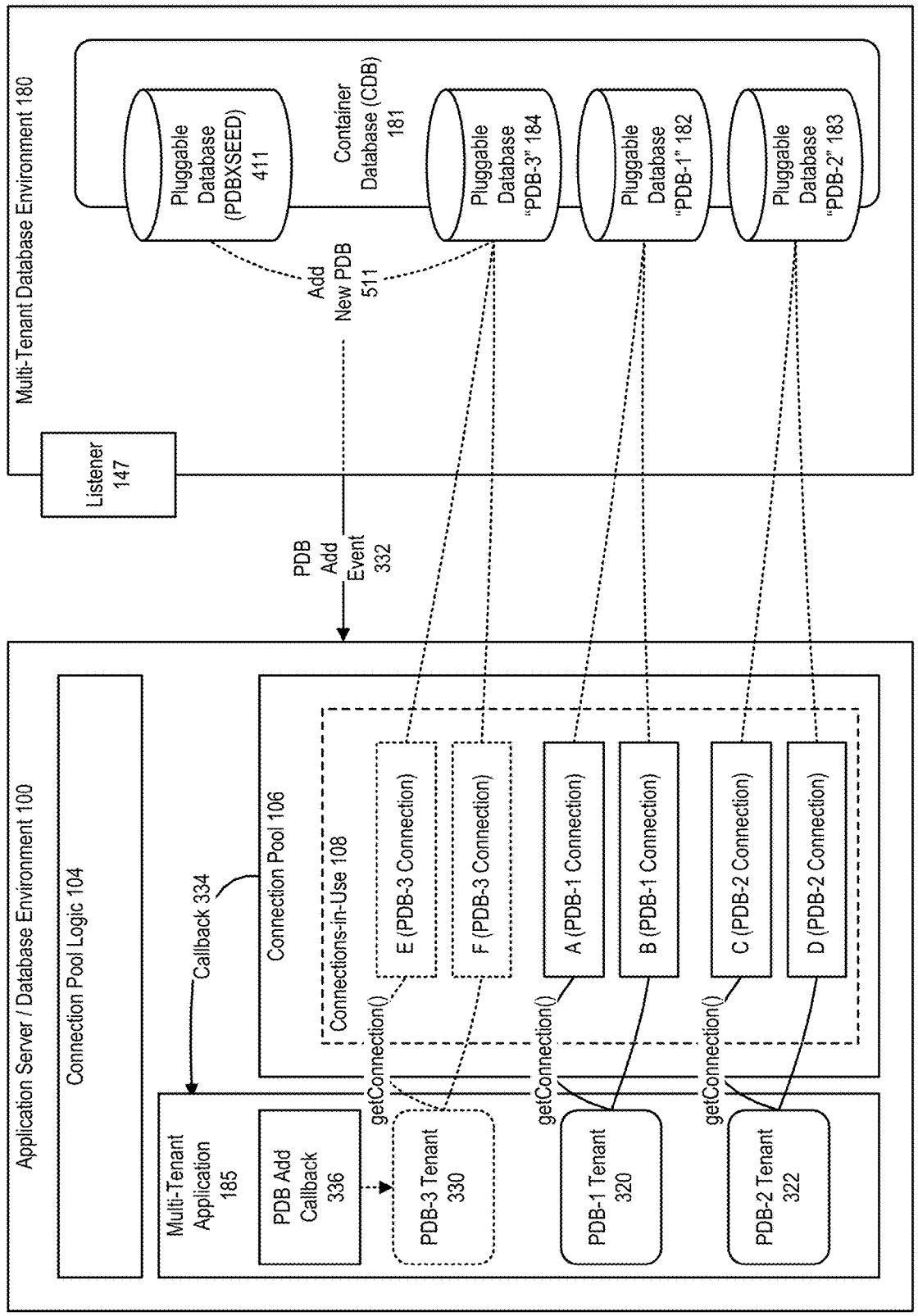
FIG. 5 further illustrates an embodiment which supports live addition of a tenant, in a connection pool environment.

FIG. 5 further illustrates an embodiment which supports live addition of a tenant, in a connection pool environment.

As illustrated in FIG. 5, in accordance with an embodiment, when an additional tenant 330, is to be added to the system, including the addition of a new pluggable database for use by that tenant, then a PDB-add event 332 is generated by the database environment, which is detected by the connection pool, and is thereafter used to configure, in this example, a data source for use by the new tenant.

In accordance with an embodiment, a multi-tenant application can write or otherwise use a callback method 334, to process the PDB-add event, and to determine required information such as a service name. The callback can initiate 336, the new tenant configuration/addition, by calling the connection pools' shared APIs.

In accordance with an embodiment, the support for live addition of a tenant can utilize functionality for dynamic relocation of tenants, as described for example in co-pending U.S. patent application titled "SYSTEM AND METHOD FOR PROVIDING DYNAMIC RELOCATION OF TENANTS IN A MULTI-TENANT DATABASE ENVIRONMENT", U.S. application Ser. No. 15/227,897, filed Aug. 3, 2016, which is herein incorporated by reference, and which describes how a database and connection pool can communicate with one another, wherein the database informs the connection pool that a PDB has been created.

In accordance with an embodiment, the steps involved in the live addition of a tenant to the connection pool, can include:

1. The database server sends a PDB-add event to the application server/database environment containing the connection pool.

2. The multi-tenant application writes a callback method to process the PDB-add event, to determine required information such as a service name.

3. The callback initiates the new tenant configuration/ addition by calling the connection pools' shared APIs.

4. After the new tenant configuration, the tenant can use the shared pool like other, existing, tenants.

In accordance with an embodiment, the new pluggable database "PDB-3" 184 can be created using the seed PDB, and added to or plugged into the container database. To create a new PDB using the seed PDB, files associated with the seed PDB can first be copied to a new location. Then, a structured query language (SQL) CREATE statement can be executed with a plurality of clauses configured to further define the PDB. For example, the plurality of clauses can be used to specify a storage limit, a default tablespace, a path-prefix, and one or more predefined roles that can be granted to the PDB_DBA role.

Alternatively, the new PDB can be cloned from an existing PDB, or created from a non-CDB database. The new PDB can also represent an existing unplugged PDB that has been plugged back into the container database.

In accordance with an embodiment, the PDB-add event can be generated by the database environment in response to the addition of the new PDB to the container database, which can be configured to support detection and run-time publication of a plurality of database events, including SERVERERROR, LOGON, LOGOFF, STARTUP, SHUTDOWN, and PDB ADDITION. The multi-tenant application and/or the connection pool can subscribe to the database events, and receive asynchronous notification of the database events, for example, the PDB add event 332.

In accordance with an embodiment, a high availability framework, for example, an Oracle Fast Application Notification (FAN) or similar notification functionality, can be used to communicate the database events to the connection pool. The notifications can be used to notify other processes about configuration and service level information that includes service status changes, such as UP or DOWN events. The database events can be published using an Oracle Notification Service and Oracle Streams Advanced Queuing or similar publication functionality. The publication mechanisms are automatically configured as part of an Oracle RAC installation. Applications can use the FAN framework programmatically by using the JDBC and Oracle RAC FAN application programming interface (API), or by using callbacks to subscribe to the database events and to execute event handling actions upon the receipt of an event.

Figure 6:
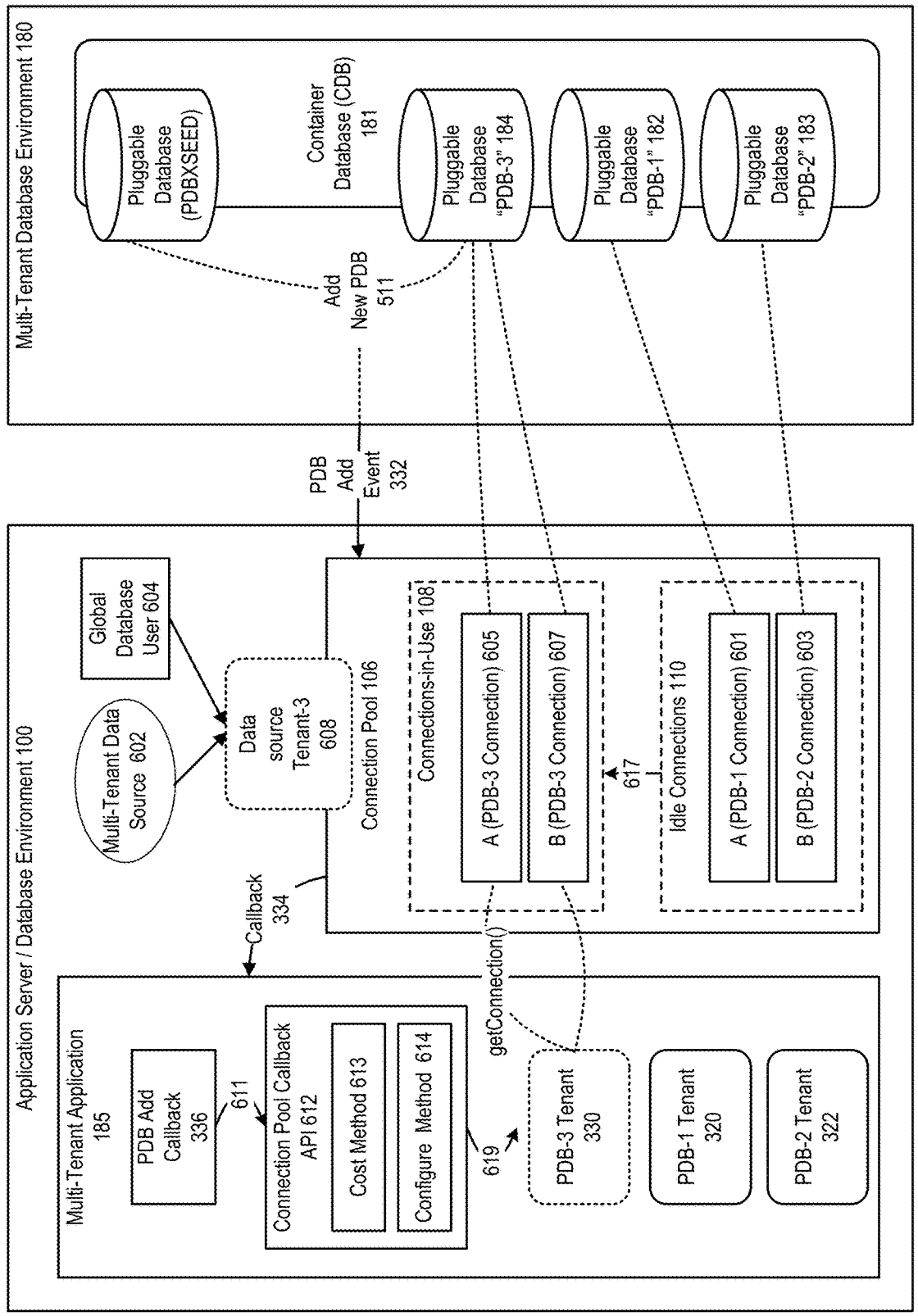
FIG. 6 further illustrates an embodiment which supports live addition of a tenant, in a connection pool environment, in accordance with an embodiment.

FIG. 6 further illustrates an embodiment which supports live addition of a tenant, in a connection pool environment, in accordance with an embodiment.

In accordance with an embodiment, to add the new tenant to the connection pool, a multi-tenant data source 602 can be used in combination with a global database user 605 with access privileges to any PDB in the container database, UCP connection labeling features described above, and a connection pool callback API 612.

In accordance with an embodiment, the multi-tenant data source can be a data object used to identify and describe the container database; and can include a plurality of properties for use by the connection to create data sources for the tenants, for use by the tenants to obtain connections from the connection pool. The properties can include the location of a database server that hosts the container database, the network protocol to use to communicate with the database server, and security information to connect to the container database.

In accordance with an embodiment, the callback method can be implemented by the multi-tenant application, and registered with the connection pool. When the container database generates the PDB add event in response to the addition of the new PDB, the connection pool can consume the event, and can invoke (i.e. call back) the registered callback method to process the PDB add event.

In accordance with an embodiment, the callback method can obtain required information (e.g., a service name on the new PDB) from the PDB add event, and use the required information and the global database user 604 to create a data source (e.g., data source tenant-3 608) for the new PDB from the multi-tenant data source. The callback method can subsequently call 611 the connection pool callback API to configure 619 the new tenant to use connections in the connection pool through the data source.

As further shown in FIG. 6, the multi-tenant application can implement the connection pool callback API, including a cost method 613 and a configure method 614. The cost method and the configure method can be registered with the connection pool, which can be a UCP connection pool instance. The cost method can be used to project the cost of configuring a connection considering label-matching differences. Upon a connection request, the connection pool can use the cost method to select a connection with the least configuration cost. The configure method can be called by the connection pool on a selected connection before returning it to a tenant of the multi-tenant application, to set the state of the connection and apply or remove any labels to/from the connection.

In accordance with an embodiment, the configure method can use a container-setting statement (e.g., ALTER SESSION SET CONTAINER=<PDB Name>) to avoid creating new connections from scratch. The container-setting statement can switch the PDB associated with a connection from one to another in the container database, so that the connection pool does not have to create a new connection to the new PDB if there is an existing connection to a different PDB.

As an illustrative example, when the new tenant (i.e. PDB-3 tenant 330) requests a connection to PDB-3 by calling the getConnection( )method with the corresponding label that is mapped to PDB-3, the connection pool can search for an available/idle connections with the corresponding label. If an idle connection includes the corresponding label, the idle connection can be returned to the new tenant. Otherwise the connection pool can invoke the user-implemented callback configure method to use the container-setting statement to set the idle connection to PDB-3.

In accordance with an embodiment, the container-setting statement can be passed to the container database server and parsed. The container database server can execute the statement, assign a PDB-specific role to the new tenant, connect the idle connection to PDB-3, and return the corresponding database ID and other properties to JDBC. The JDBC can subsequently notify the connection pool, which can hand the idle connection to the new tenant for use.

As shown in FIG. 6, the idle connections A 601 and B 603, which are respectively labeled with the database ID "PDB-1" and "PDB-2, indicating that the two connections are connected to the two PDBs. The two connections (601, 603) can be switched 617 from "PDB-1" and "PDB-2" respectively to "PDB-3" using the container-setting statement described above, to be configured into different connections (605, 607) for use by the new tenant.

As such, when a new PDB is added to the container database, the system can dynamically add the new tenant to the connection, to enable the new tenant to use existing connections in the connection pool, without the system administrator manually configuring the new tenant.

Figure 7:
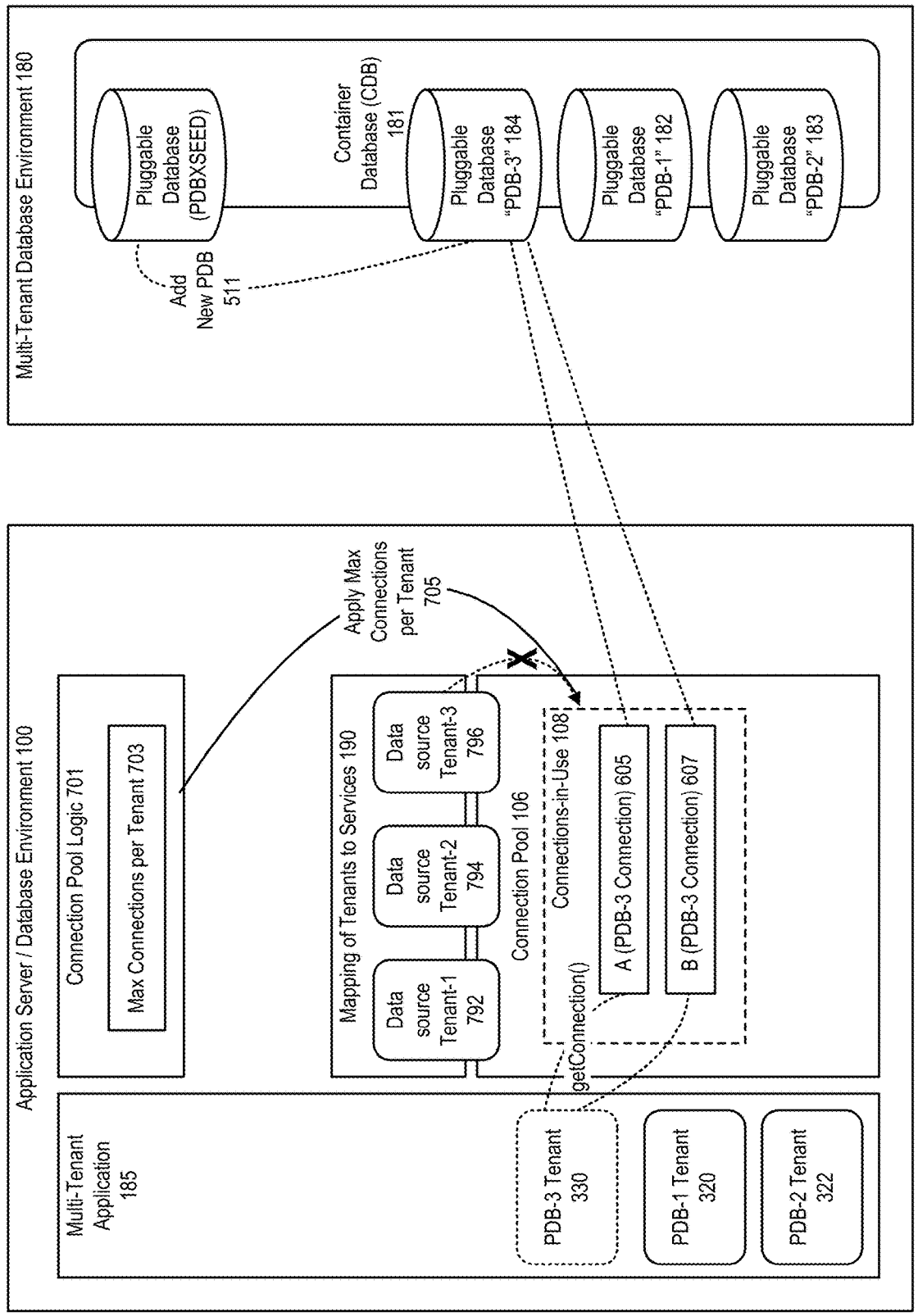
FIG. 7 further illustrates an embodiment which supports live addition of a tenant, in a connection pool environment, in accordance with an embodiment.

FIG. 7 further illustrates an embodiment which supports live addition of a tenant, in a connection pool environment, in accordance with an embodiment.

In accordance with an embodiment, the system can include support for limiting the maximum number of connections for each of the plurality of tenants, including the new tenant.

For example, when a tenant is associated with a service, configuring a maximum connections per service limit on the connection pool indicates to the system that the connection pool should not repurpose existing connections, or create new connections for a service, if the maximum connections per service limit has been reached for that particular service. This provides a fair chance to all the services configured in the shared connection pool. If the maximum number of connections per service limit is reached for a particular tenant, then any further connection requests for that service will be required to wait for one of that tenant's connections to become available.

In a multi-tenant environment that includes a shared global cache of database connections, there is a possibility that a particular tenant can starve other tenants, by borrowing a huge number of connections from the shared connection pool.

In accordance with an embodiment, to avoid this situation, the system can include a "max connections per tenant" functionality, which operates to prevent connection starvation for a tenant, and ensures a fair use of the shared pool.

Configuring a maximum connections per service limit on a shared pool indicates that the system controlling the shared pool cannot repurpose existing connections, or cannot create new connections, for a service, if the maximum connections per service limit has been reached for that particular service. This provides a fair chance to all the services configured in the shared pool.

If the maximum connections per service limit is reached for a tenant, then any further connection requests for that service will be required to wait for tenant's connection to become available.

As illustrated in FIG. 7, each of the plurality of data sources 792, 794 and 796 can be configured from the multi-tenant data source described above, for a mapping of tenants to services, and for use by each tenant to obtain connections from the connection pool.

In accordance with an embodiment, a max connections per tenant 701 logic or setting, can be applied by the connection pool, to control the maximum number of connections associated with any particular tenant 703, for example the maximum number of connections associated with a Tenant-3's data source (796), or service associated with that tenant.

In accordance with an embodiment, the max connections per tenant setting can be provided in the form of a user-setting or user-defined value, or can be automatically calculated through the use of, for example, a feedback loop.

In accordance with an embodiment, exemplary means of configuration include:

1. Allow the user to set a max-per-tenant manually, and the connection pool environment adheres to this limit at all times.

2. Allow the connection pool environment to dynamically fix a proportion of pool capacity to a tenant, depending on the current usage, while ensuring that the assigned proportion does not cross a fixed inbuilt threshold. If the usage pattern changes, then the connections are redistributed dynamically among tenants.

As illustrated in FIG. 7, in accordance with an embodiment, the max connections per tenant logic or setting, in this example associated with a particular Tenant-3, can be applied by the connection pool environment, to control 705 the maximum number of connections associated with, in this example, Tenant-3's data source.

Figure 8:
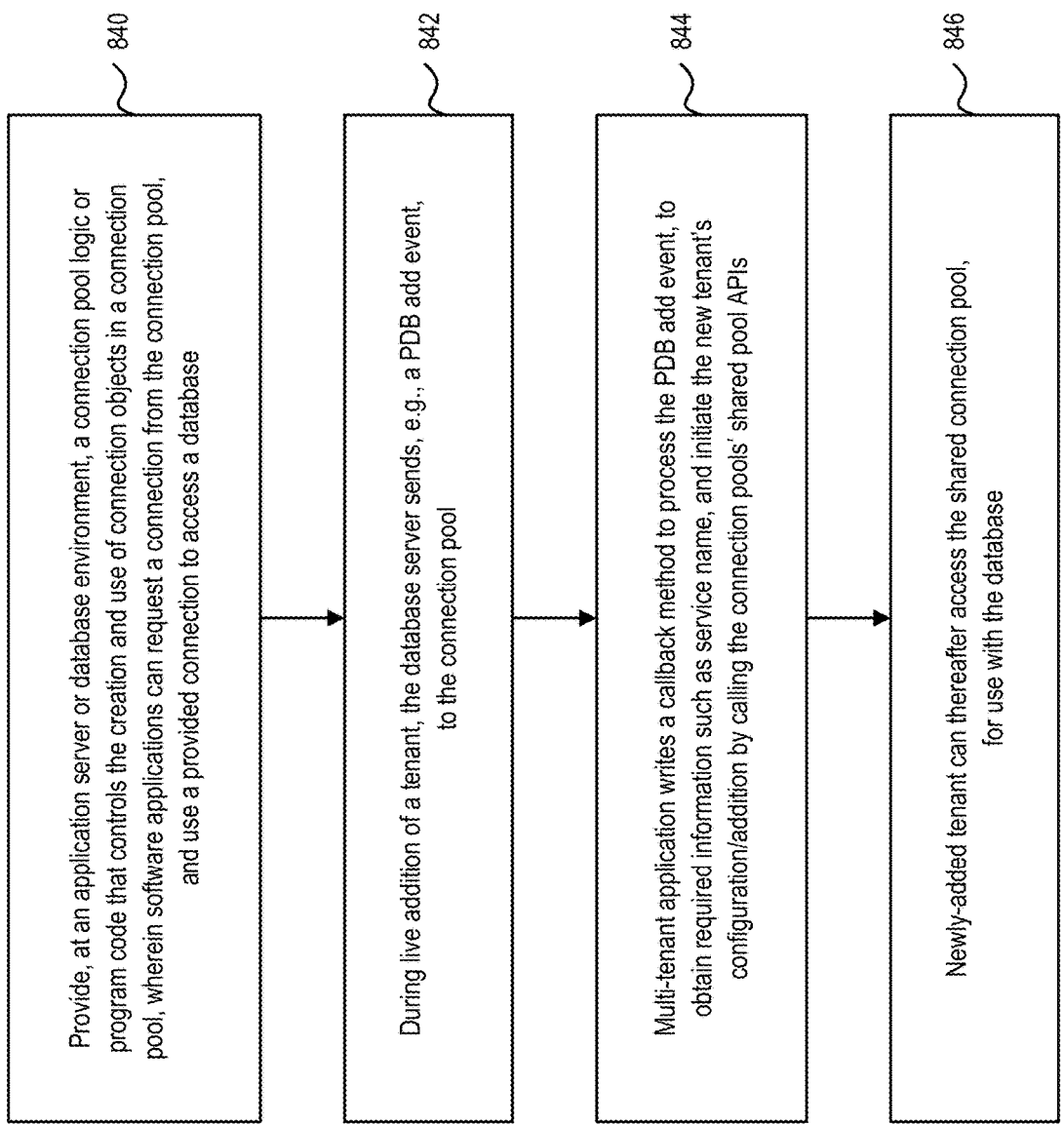
FIG. 8 illustrates a method of supporting live addition of a tenant, in a connection pool environment, in accordance with an embodiment.

FIG. 8 illustrates a method of supporting live addition of a tenant, in a connection pool environment, in accordance with an embodiment.

As illustrated in FIG. 8, at step 840, at an application server or database environment, a connection pool logic or program code is provided that controls the creation and use of connection objects in a connection pool, wherein software applications can request a connection from the connection pool, and use a provided connection to access a database.

At step 842, during the live addition of a tenant, the database server sends, e.g., a PDB-add event, to the connection pool.

At step 844, the multi-tenant application can write a callback method to process the PDB-add event, to obtain required information such as service name, and initiate the new tenant's configuration/addition by calling the connection pools' shared pool APIs.

At step 846, the newly-added tenant can thereafter access the shared connection pool, for use with the database.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for providing access to a database in a multi-tenant environment, including support for live addition of a tenant, comprising:
   a computer including a processor;
   wherein the computer controls creation and use of connection objects in a connection pool adapted to receive requests from software applications to request a connection from the connection pool, wherein a provided connection is then used by a software application to access a database instance at a database environment,
      wherein a plurality of database instances provided by the database environment, can be associated with a plurality of tenants that access a multi-tenant software application via one or more services, and
      wherein the system includes a mapping of particular tenants to particular data sources that are associated with particular ones of the database instances; and
   wherein the system is adapted to perform live addition of a tenant, including that, upon addition of a new database instance to the database environment for use by the tenant, the database environment generates an event notification to notify the connection pool, wherein information associated with the event notification identifies the new database instance and is processed to at least one of add or configure the tenant to access the connection pool, for use with the database environment.

2. The system of claim 1, further comprising:
   wherein, when a pluggable database instance, for use by the tenant, is added to the database, an event is generated; and
   wherein the connection pool consumes the event, and dynamically configures the tenant, to access the connection pool.

3. The system of claim 2, wherein the pluggable database instance is created from a seed template database.

4. The system of claim 1, wherein the connection pool provides a cache of connection objects, each of which connection object represents a particular connection that can be requested by a software application to connect to a database instance.

5. The system of claim 4, wherein a client software application can attach arbitrary name/value pairs to a particular connection type, to label the particular connection type, and then request a connection with a desired label from the connection pool.

6. The system of claim 1, whereupon the tenant being added, it can borrow connections from the pool and share existing pool properties, including a maximum number of connections per tenant.

7. The system of claim 1, wherein a multi-tenant application can use a callback method to process the event, and to determine required information including a service name, for use by the tenant.

8. The system of claim 1, wherein the connection pool dynamically configuring the tenant includes configuring a data source for use by the tenant.

9. A method for providing access to a database in a multi-tenant environment, including support for live addition of a tenant, comprising:
   providing, at a computer including a processor:
   a connection pool that includes connection objects and that receives requests from software applications to request a connection from the connection pool, and ucc a wherein a provided connection is then used by a software application to access a database instance at a database environment,
      wherein a plurality of database instances provided by the database environment, can be associated with a plurality of tenants that access a multi-tenant software application via one or more services, and
      wherein the system includes a mapping of particular tenants to particular data sources that are associated with particular ones of the database instances; and
   performing a live addition of a tenant, including that, upon addition of a new database instance to the database environment for use by the tenant, the database environment generates an event notification to notify the connection pool, wherein the information associated with the event notification identifies the new database instance and is processed to at least one of add or configure the tenant to access the connection pool, for use with the database environment.

10. The method of claim 9, further comprising:
    when a pluggable database instance, for use by a tenant, is added to the database, generating an event; and
    consuming, by the connection pool, the event, and dynamically configuring the tenant, to access the connection pool.

11. The method of claim 10, wherein the pluggable database instance is created from a seed template database.

12. The method of claim 9, whereupon the tenant being added, it can borrow connections from the pool and share existing pool properties, including a maximum number of connections per tenant.

13. The method of claim 9, wherein a multi-tenant application can use a callback method, to process the event, and to determine required information including a service name, for use by the tenant.

14. The method of claim 9, wherein the connection pool dynamically configuring the tenant includes configuring a data source for use by the tenant.

15. A non-transitory computer readable storage medium, including instructions stored thereon which when read and executed by one or more computers cause the one or more computers to perform the method comprising:
    providing a connection pool that includes connection objects and that receives requests from software applications to request a connection from the connection pool, wherein a provided connection is then used by a software application to access a database instance at a database environment, wherein a plurality of database instances provided by the database environment, can be associated with a plurality of tenants that access a multi-tenant software application via one or more services, and wherein the system includes a mapping of particular tenants to particular data sources that are associated with particular ones of the database instances; and performing a live addition of a tenant, including that, upon addition of a new database instance to the database environment for use by the tenant, the database environment generates an event notification to notify the connection pool, wherein information associated with the event notification identifies the new database instance and is processed to at least one of add or configure the tenant to access the connection pool, for use with the database environment.

16. The non-transitory computer readable storage medium of claim 15, further comprising:

when a pluggable database instance, for use by a tenant, is added to the database, generating an event; and consuming, by the connection pool, the event, and dynamically configuring the tenant, to access the connection pool.

17. The non-transitory computer readable storage medium of claim 16, wherein the pluggable database instance is created from a seed template database.

18. The non-transitory computer readable storage medium of claim 15, whereupon the tenant being added, it can borrow connections from the pool and share existing pool properties, including a maximum number of connections per tenant.

19. The non-transitory computer readable storage medium of claim 15, wherein a multi-tenant application can use a callback method, to process the event, and to determine required information including a service name, for use by the tenant.

20. The non-transitory computer readable storage medium of claim 15, wherein the connection pool dynamically configuring the tenant includes configuring a data source for use by the tenant.

* * * * *

UNITED STATES PATENT AND TRADEMARK OFFICE
CERTIFICATE OF CORRECTION

PATENT NO.       : 10,742,748 B2
APPLICATION NO.  : 15/644502
DATED            : August 11, 2020
INVENTOR(S)      : De Lavarene et al.

It is certified that error appears in the above-identified patent and that said Letters Patent is hereby corrected as shown below:

In the Claims

In Column 14, Lines 22-23, in Claim 9, after "pool," delete "and ucc a".

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*